(12) United States Patent
Shimamoto

(10) Patent No.: US 7,242,289 B1
(45) Date of Patent: Jul. 10, 2007

(54) METHOD AND SYSTEM FOR SYNTHETICALLY REPRODUCING A RANDOM PROCESS

(75) Inventor: Andrew Shimamoto, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 219 days.

(21) Appl. No.: 11/063,505

(22) Filed: Feb. 23, 2005

(51) Int. Cl.
*G08B 29/00* (2006.01)
*H04L 1/14* (2006.01)
*G06F 11/00* (2006.01)

(52) U.S. Cl. .......................... 340/506; 714/48; 714/750

(58) Field of Classification Search ........ 340/506–530; 714/47–57, 728, 750
See application file for complete search history.

(56) References Cited

U.S. PATENT DOCUMENTS

| | | | | |
|---|---|---|---|---|
| 5,705,979 A | * | 1/1998 | Fierro et al. ................ | 340/517 |
| 5,721,529 A | * | 2/1998 | Vane et al. .................. | 340/515 |
| 5,923,247 A | * | 7/1999 | Dowden et al. ............. | 340/506 |
| 6,078,269 A | * | 6/2000 | Markwell et al. ........... | 340/517 |
| 6,513,129 B1 | * | 1/2003 | Tentij et al. .................... | 714/4 |
| 6,747,554 B1 | * | 6/2004 | Higashimura et al. ....... | 340/506 |
| 6,775,237 B2 | * | 8/2004 | Soltysiak et al. ............ | 370/241 |
| 6,917,288 B2 | * | 7/2005 | Kimmel et al. .............. | 340/511 |
| 7,158,026 B2 | * | 1/2007 | Feldkamp et al. ........... | 340/531 |
| 2004/0090335 A1 | * | 5/2004 | Pfefferseder et al. ........ | 340/600 |
| 2005/0174229 A1 | * | 8/2005 | Feldkamp et al. ........... | 340/506 |

* cited by examiner

*Primary Examiner*—Benjamin C. Lee
*Assistant Examiner*—Jennifer Mehmood

(57) ABSTRACT

A method and system are provided for synthetically reproducing a random process. A test apparatus is coupled to a data-collection apparatus. The data-collection apparatus collects status data corresponding to several alarm points. The test apparatus generates at a regular frequency synthetic status data relating to the alarm point and transmits the synthetic status data to the data-collection apparatus. Finally, based on a comparison of the generated synthetic status data and corresponding responses by the data-collection apparatus, a determination is made as to whether the random process has occurred.

21 Claims, 7 Drawing Sheets

METHOD AND SYSTEM FOR SYNTHETICALLY REPRODUCING A RANDOM PROCESS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Background of the Disclosure

Communication networks, and, in particular, large communication networks may have many end-points interconnected by transmission paths to other end-points in a network backbone. Communication signals traversing the communication network's backbone between end-points degrade over long distances due to distortion inherent in the network's transmission medium. Attenuation and dispersion are examples of physical phenomena that contribute to distortion. Service provided by the communication networks may be impaired if the distortion experienced by a communications signal becomes severe. To mitigate the effects of distortion, networks may strategically employ regenerator and/or repeater sites at various points in the network backbone.

Various data-collection apparatuses, a subset of which are often termed alarm collection devices, are utilized to monitor alarm points (housekeeping alarms) in various sites in the network that affect the site's working status. Regenerator and/or repeater sites are examples of sites that utilize data-collection apparatuses.

The data-collection apparatus may send status information to a monitoring site staffed by technicians. Each monitoring site may be responsible for monitoring thousands of alarm points in the communications network. Furthermore, many alarms are received per day at each monitoring site. In many instances, an alarm may be cleared by the technicians at the monitoring site. In other instances, an alarm may clear itself. However, if an alarm is detected by the data-collection apparatus and the alarm cannot be cleared, a team of technicians is sent to the site to investigate the source of the alarm. Sending a team of technicians is costly and time-consuming because many sites are located in remote areas. In some instances, an alarm which is no longer active fails to clear. In other words, the data-collection apparatus is in a "stuck-alarm" condition. The technicians at the monitoring site assume the alarm is active and will be dispatched to investigate the source of the alarm. Thus, the existence of a stuck-alarm condition requires a costly and inefficient investigation.

SUMMARY

Embodiments of the present invention solve at least the above problems by providing a system and method for synthetically reproducing a random process. Embodiments of the present invention have several practical applications in the technical arts including reproducing randomly occurring problems in communication network equipment, such as the occurrence of stuck-alarms in data-collection apparatus located at remote sites in the network.

In one embodiment, a system is provided for reproducing a randomly occurring process. The system comprises a data-collection apparatus that collects status data on alarm points, and a test device that transmits, at a regular frequency, the synthetic status data to the data-collection apparatus. The synthetic status data mimics status data generated by the alarm points. Further, the system comprises a data store for storing the synthetic status data and data generated by the data-collection apparatus in response to the synthetic status data. Whether the randomly occurring process is reproduced is determined by analysis of the data located in the data store.

Another embodiment provides a method for synthetically reproducing a random process. The method comprises coupling a test apparatus to a data-collection apparatus. The data-collection apparatus collects status data corresponding to several alarm points. The method further comprises the test apparatus generating, at a regular frequency, synthetic status data relating to the alarm points and transmitting the synthetic status data to the data-collection apparatus. Finally, the method comprises determining, based on a comparison of the synthetic status data and corresponding responses by the data-collection apparatus, whether the random process has occurred.

Still another embodiment provides a method for determining the error-rate of a device for monitoring alarm points in a network communications environment. The method comprises generating, at a regular frequency, synthetic alarm and corresponding alarm-clear messages and transmitting the messages to alarm collection devices. Finally, the method comprises detecting if a respective alarm-clear message is generated by each of the alarm collection devices for each of the synthetic alarm and corresponding clear messages. Whether the alarm collection devices generate an alarm-clear message in response to the synthetic alarm-clear message determines the error-rate of each of the alarm collection devices.

BRIEF DESCRIPTION OF THE SEVERAL VIEWS OF THE DRAWINGS

Embodiments of the present invention are described in detail below with reference to the attached drawing figures, which are incorporated by reference herein and wherein.

DETAILED DESCRIPTION

Figure 1:
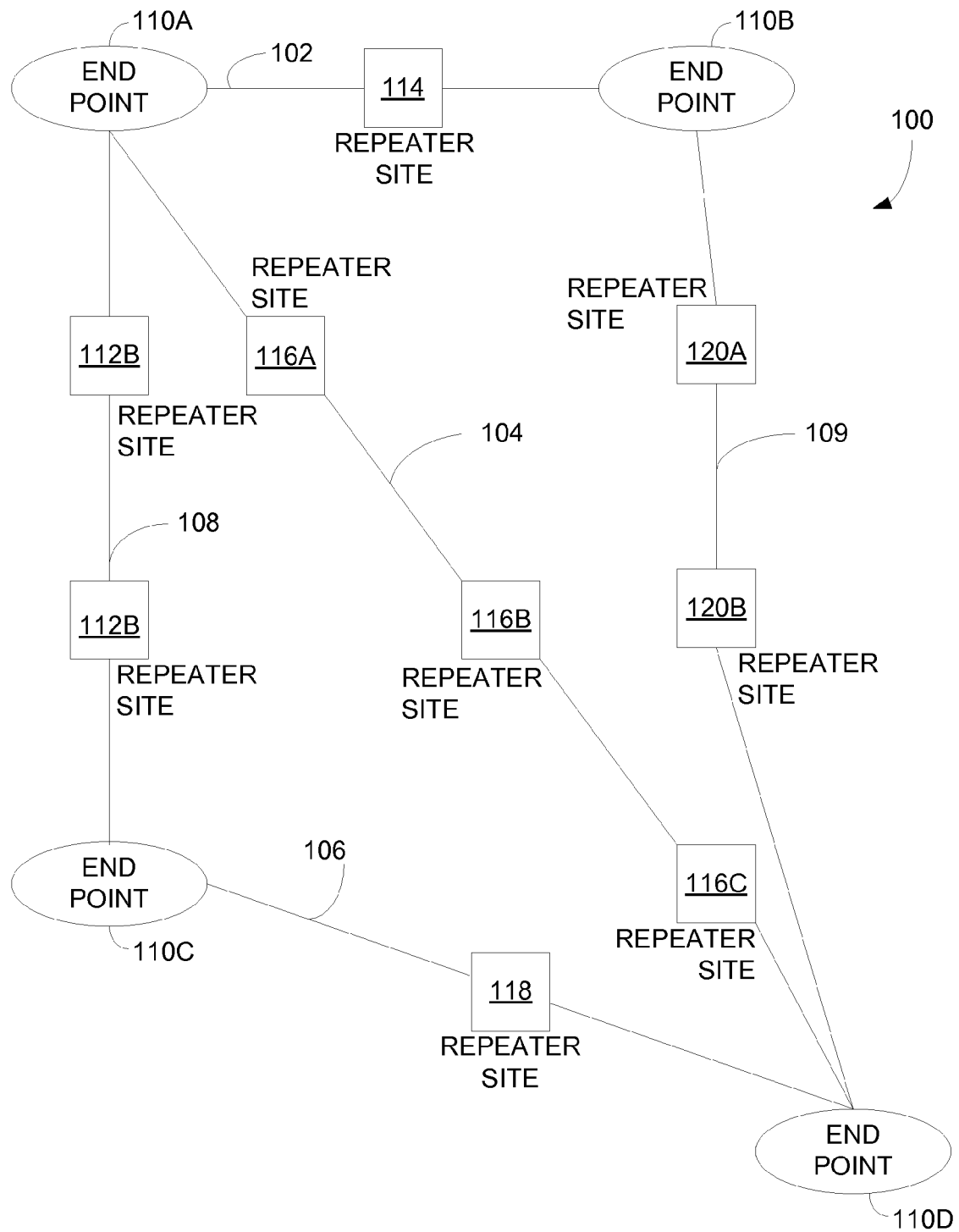
FIG. 1 is an illustration of an exemplary communications network showing multiple end-points interconnected by multiple communication paths having regenerator and/or repeater sites in accordance with an embodiment of the present invention.

Embodiments of the present invention provide a novel method and system for reproducing randomly occurring processes. More particularly, but not by way of limitation, the methods and systems illustrated in the various embodiments of the present invention utilize a testing apparatus coupled to a data-collection apparatus in a controlled environment for synthetically producing, at a regular frequency, status data to synthetically reproduce a random process in the data-collection apparatus.

A data-collection apparatus includes, but is not limited to, an alarm collection device (ACD) commonly used to monitor alarm points in network communication environments. Further, status data includes, but is not limited to, alarm and alarm-clear messages generated by the alarm points. The alarm and alarm-clear messages may include, but are not limited to, housekeeping alarms. Housekeeping alarms, as used in the art, designate signals originating from various alarm points in communication network sites. Synthetic alarm and alarm-clear messages are analyzed to determine if the data-collection apparatus or ACD produces corresponding alarm-clear messages. Because the synthetic messages occur at a regular frequency, the synthetic alarm and alarm-clear messages and the corresponding messages produced by the ACD in response to the synthetic messages may be compared. Once a discrepancy is found, a determination of the cause of the fault causing the randomly occurring process may be found using data having the discrepancy. By optimizing the regular frequency, the number of message iterations transmitted to the ACD may be increased, and, thus, the probability of reproducing the random process or fault increases.

For ease of understanding, the various embodiments of the present invention are described in terms of reproducing a random process in an ACD in a network communications environment. As previously discussed, an ACD, as used herein, refers to an exemplary type of data-collection apparatus, which may or may not be used in a network communications environment. Therefore, the scope of the embodiments of the present invention should not be construed as limited to ACDs or other such equipment in network communication environments. The scope of the embodiments of the present invention may extend to any environment using data-collection apparatus where the reproduction of a randomly occurring process is desirable to determine the cause of the random process.

Further, various technical terms are used throughout this description. A definition of such terms can be found in *Newton's Telecom Dictionary* by H. Newton, 20th Edition (2004). These definitions are intended to provide a clearer understanding of the ideas disclosed herein but are in no way intended to limit the scope of embodiments of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, embodiments of the present invention may take the form of a hardware embodiment, a software embodiment, or an embodiment combining software and hardware. In one embodiment, the present invention takes the form of a system that includes hardware having circuitry operable to implement a method for synthetically reproducing a randomly occurring process in a controlled testing environment. Once the randomly occurring process is reproduced, the cause of the random process may be found.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, data stores, or machine-readable media, include media implemented in any method or technology for storing information. Examples of stored information include computer-useable instructions, data structures, program modules, and other data representations. Computer-storage media or data stores include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of the embodiments of the present invention.

Turning now to FIG. 1, there is illustrated an exemplary communications network 100. Communications network 100 comprises end-points 110A, 110B, 110C, and 110D coupled by communications paths 102, 104, 106, 108, and 109. Communications paths 102, 104, 106, 108, and 109 may comprise various regenerator and/or repeater sites between end-points 110A–D. For example, communications path 104 coupling end-point 110A and 110D comprises regenerator or repeater sites 116A, 116B, and 116C. Placement of regenerator and/or repeater sites along communications paths may be determined by the amount of distortion experienced by communication signals traversing a communications path. As previously discussed, regenerator and/or repeater sites may be utilized to remove distortion.

Continuing with reference to exemplary network 100 of FIG. 1, end-points such as end-point 110A, may be a local area network (LAN), a metropolitan area network (MAN), or a wide area network (WAN). Communications paths 102, 104, 106, 108, and 109 may comprise fiber optic cables and/or wire line cables for transmission of communication signals between end-points. Further, the various regenerator and/or repeater sites may comprise either electronic or optical circuitry utilized to reshape and/or amplify communication signals traversing communication paths 102, 104, 106, 108, and 109.

Figure 2:
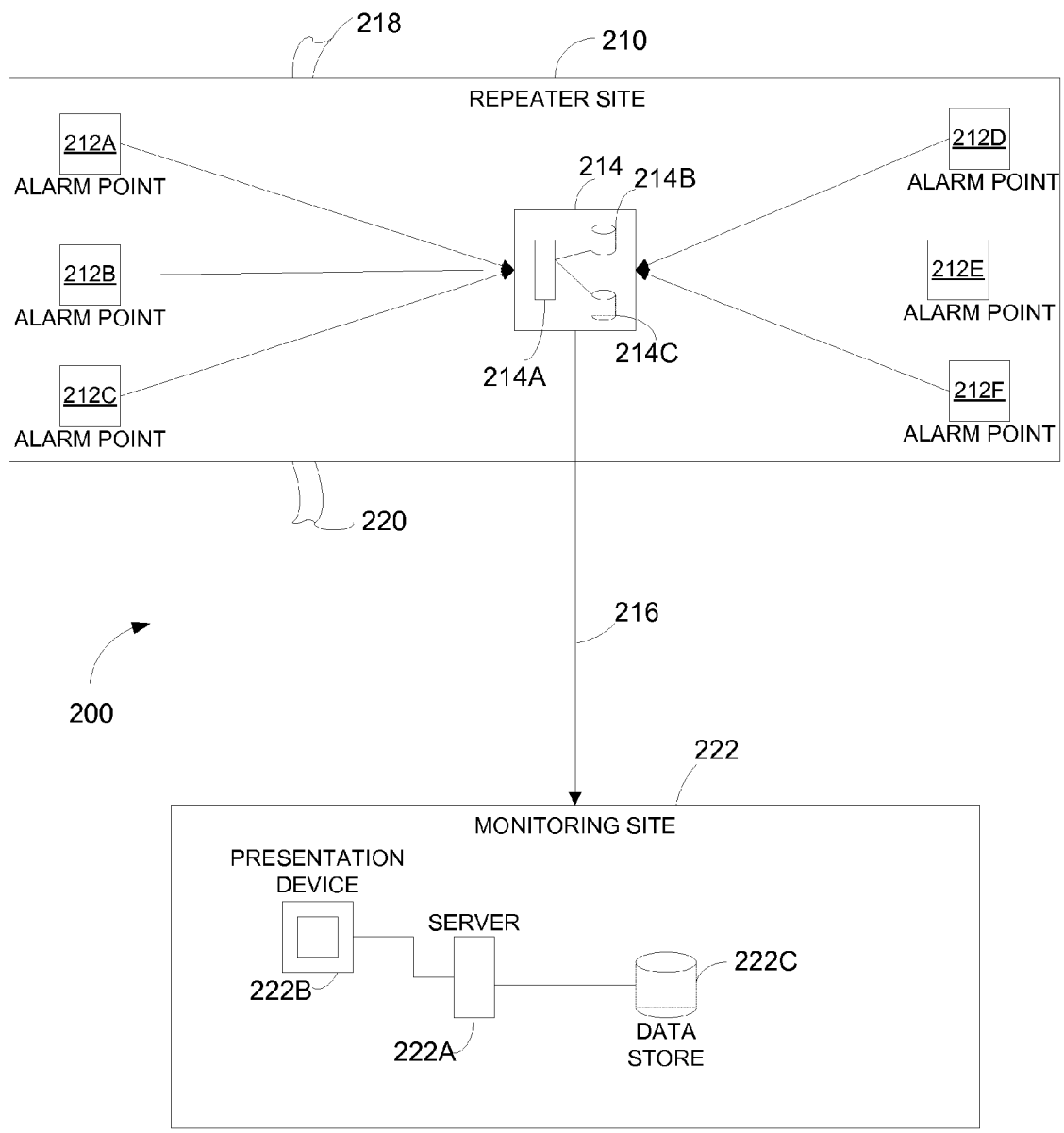
FIG. 2 is a diagram of an exemplary regenerator and/or repeater site of FIG. 1 illustrating one embodiment of a data-collection apparatus monitoring alarm points and communicating with a monitoring site in accordance with an embodiment of the present invention.

Turning now to FIG. 2, a system 200 illustrates a diagram representative of a regenerator and/or repeater site 210 of FIG. 1. System 200 shows an ACD 214 monitoring housekeeping alarms generated by alarm points and coupled to a monitoring site 222. ACD 214 may be coupled to alarm points monitoring, by way of example, the status of water-level, toxic-gas, and door alarms. System 200 comprises regenerator and/or repeater site 210, an incoming communications path 218, an outgoing communications path 220, and a communications path 216 coupling ACD 214 to monitoring site 222. Regenerator and/or repeater site 210 comprises ACD 214 coupled to alarm points 212A, 212B, 212C, 212D, 212E, and 212F. Alarm points 212A–F may generate housekeeping alarms monitored by ACD 214. Further, ACD 214 may comprise an ACD server 214A coupled to one or more data stores 214B and 214C. Monitoring site 222 may comprise a monitoring site server 222A, a presentation device 222B, and at least one data store 222C coupled to server 222A. Moreover, servers 214A and 222A may include workstations, personal computers, mainframe computers, or any other suitable computing devices. Data stores 214B, 214C, and 222C may include hard drives, portable storage mediums, or any other suitable storage medium capable of storing data in data structures. Further, data structures may be, but are not limited to, structures such as spreadsheets.

In operation, ACD 214 monitors housekeeping alarms from alarm points 212A–F. Alarm points 212A–F monitor the status of, but not limited to, door alarms, fire and smoke alarms, high-water-level alarms, generator alarms, power-failure alarms, and toxic-gas alarms. Alarms originating from alarm points 212A–F may be communicated to server 214A of ACD 214. The alarms may be stored in one or more data stores 214B and 214C. Data structures may be created on said data stores creating alarm logs.

Generally, alarm and alarm-clear messages are generated by an alarm point comprising a relay switch having a contact closure that is monitored by an ACD. Typically, the ACD provides voltage to the contact closure of the relay. If the ACD is supplying current, the relay is closed, an alarm condition exists, and alarm data is stored in an alarm log. If the ACD is not supplying current, the relay is open, and no alarm is generated or an alarm is cleared. If an alarm is cleared, a corresponding alarm-clear message is stored in the alarm log.

The data structures that include alarm logs generated and stored in one or more data stores 214B and 214C may be monitored by technicians at monitoring site 222 via presentation device 222B. Incoming alarm log information may be transmitted to monitoring site 222 via communications path 216 and processed by monitoring server 222A and stored in data store 222C. Once an alarm is detected at an alarm point on presentation device 222B, and if the alarm is not cleared by ACD 214, a technician is sent to monitoring site 210 to analyze and fix the alarming element, such as a generator. As previously mentioned, sometimes ACD 214 does not report an alarm-clear message from either one or a combination of alarm points 212A–F. This may be termed a "stuck alarm" condition. Thus, dispatching a technician to regenerator and/or repeater site 210 is unnecessary and costly.

Figure 3:
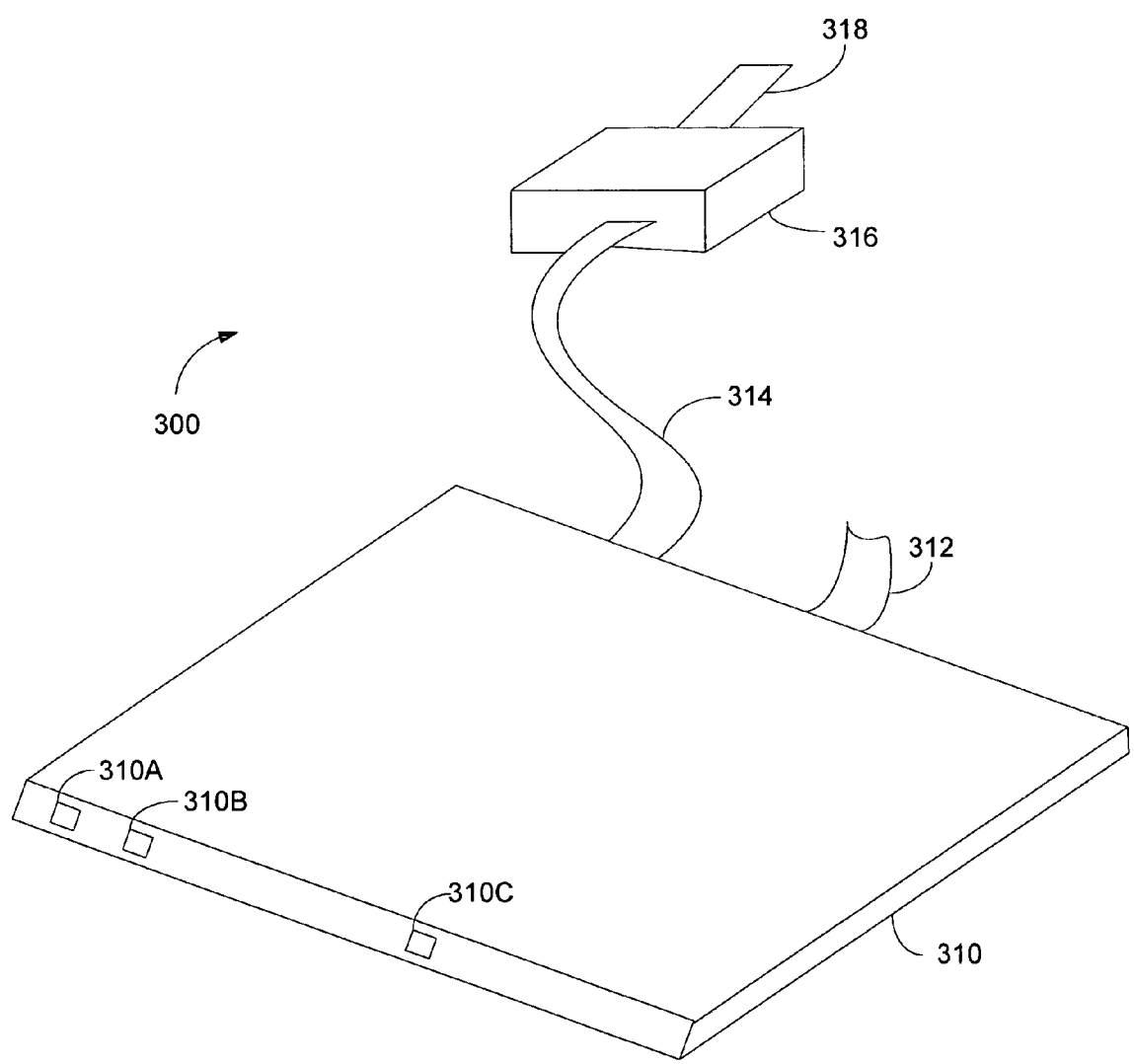
FIG. 3 is one embodiment of a system illustrating a testing apparatus coupled to one embodiment of a data-collection apparatus.

Referring now to FIG. 3, there is illustrated one embodiment of a testing system for replicating a stuck-alarm condition on an ACD. Testing system 300 comprises a test apparatus 316, an ACD 310, ports 310A–C coupled to alarm points, communications path 314 coupling testing apparatus 316 to ACD 310, communications path 318 coupling testing apparatus 316 to a data store (not shown), and communications path 312 coupling ACD 310 to a data store (not shown).

Testing apparatus 316 generates synthetic status data relating to one or more alarm points. As previously mentioned, status data may include, but is not limited to, an alarm and a corresponding alarm-clear message. The synthetic status data is generated at a regular frequency so as to determine the response of ACD 310 to each corresponding instance of status data. Synthetic status data is stored in one or more data stores (not shown) via communications path 318 and the response to each respective instance of status data transmitted from testing apparatus 316 is communicated to a data store (not shown) through communications path 312. The regular frequency should be optimized so as to have sufficient resolution to monitor each transition between an alarm and an alarm-clear message for each instance of status data. The regular frequency is determined based upon the type of ACD (or other equipment being tested).

Figure 4:
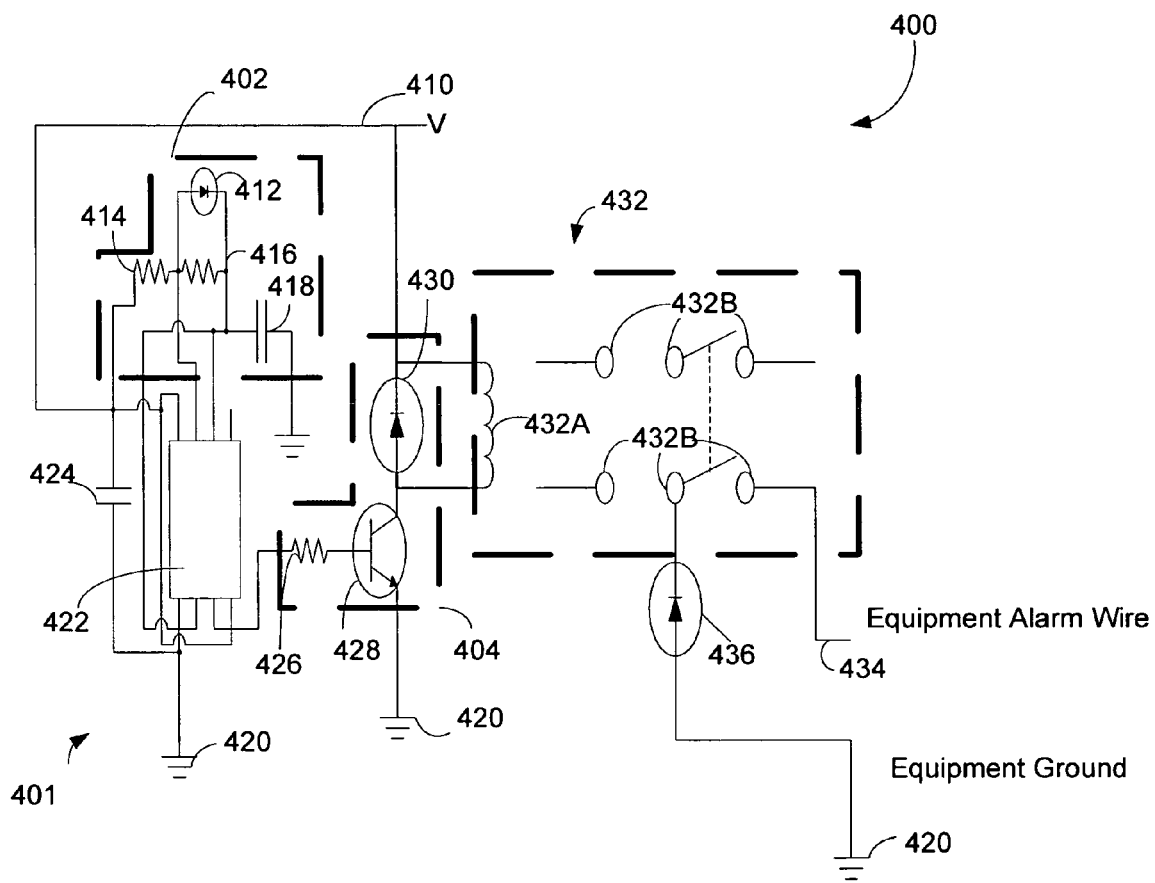
FIG. 4 is a schematic of one embodiment of a testing apparatus circuitry.

Referring now to FIG. 4, there is shown a schematic diagram illustrating one embodiment of circuitry comprising testing apparatus 316. Circuitry 400 comprises a commercially available timing device 422, a power supply 410, timing circuitry 402, grounding points 420, and output circuitry 404 coupled to an ACD circuit 432. Power supply 410 may be any commercially available power supply capable of supplying voltage potentials anywhere between about 3–15V. Further, grounding points 420 of output circuitry 404 and ACD circuitry 432 should be coupled to a common ground or the ACD equipment ground.

Timing circuitry 402 may comprise resistors 414 and 416, a diode 412, and a capacitor 418. Circuitry 402 should be chosen so as to force timer 422 into an astable mode so as to produce an oscillating output signal. The formula for the frequency of the output pulses, which reproduce status data (alarm and alarm-clear messages) produced by circuitry 404 is determined by the following formula (1):

$$\text{frequency} = \frac{1.44}{(r_{414} + 2 \times r_{416})} \times c_{418} \quad (1)$$

The duty cycle of the output pulse waveform may be given by the following equation (2):

$$\text{dutycycle} = \frac{\text{high time}}{\text{pulse time}} \quad (2)$$

The high and low times of the pulse from output circuitry 404 may be expressed as equations (3) and (4):

$$\text{high time} = 0.69 \ (r_{414} + r_{416}) \times c \quad (3)$$

$$\text{low time} = 0.69 \ (r_{416} \times c) \quad (4)$$

The duty cycle for replicating status data transmitted to ACD circuitry 432 should be 50%. Thus, the values for resistors 414 and 416 and capacitor 418 should be chosen to achieve a duty cycle of 50%. Output circuitry 404 comprises resistor 426, open-drain bipolar junction (BJT) transistor 428 and diode 430 coupled to a relay 432A between testing circuitry 401 and ACD circuitry 432.

ACD circuitry 432 may be represented by a series of contact closures 432B. When the contact closures 432B are open, no alarm state exists, or an alarm is cleared. However, when contact closures 432B are closed, an alarm is generated. Output 434 coupled to contact closures 432B transmits an alarm and an alarm-clear signal. Furthermore, a communications network utilizing ACD circuitry 432 may be represented by power diode 436 coupled to equipment ground 420. Although the embodiment illustrated by circuitry 400 is sufficient for producing pulses representing alarm and alarm-clear messages, other embodiments may use different circuitry. Accordingly, the scope of the embodiments of the present invention should not be construed to be limited to the circuitry disclosed in FIG. 4.

Figure 5A:
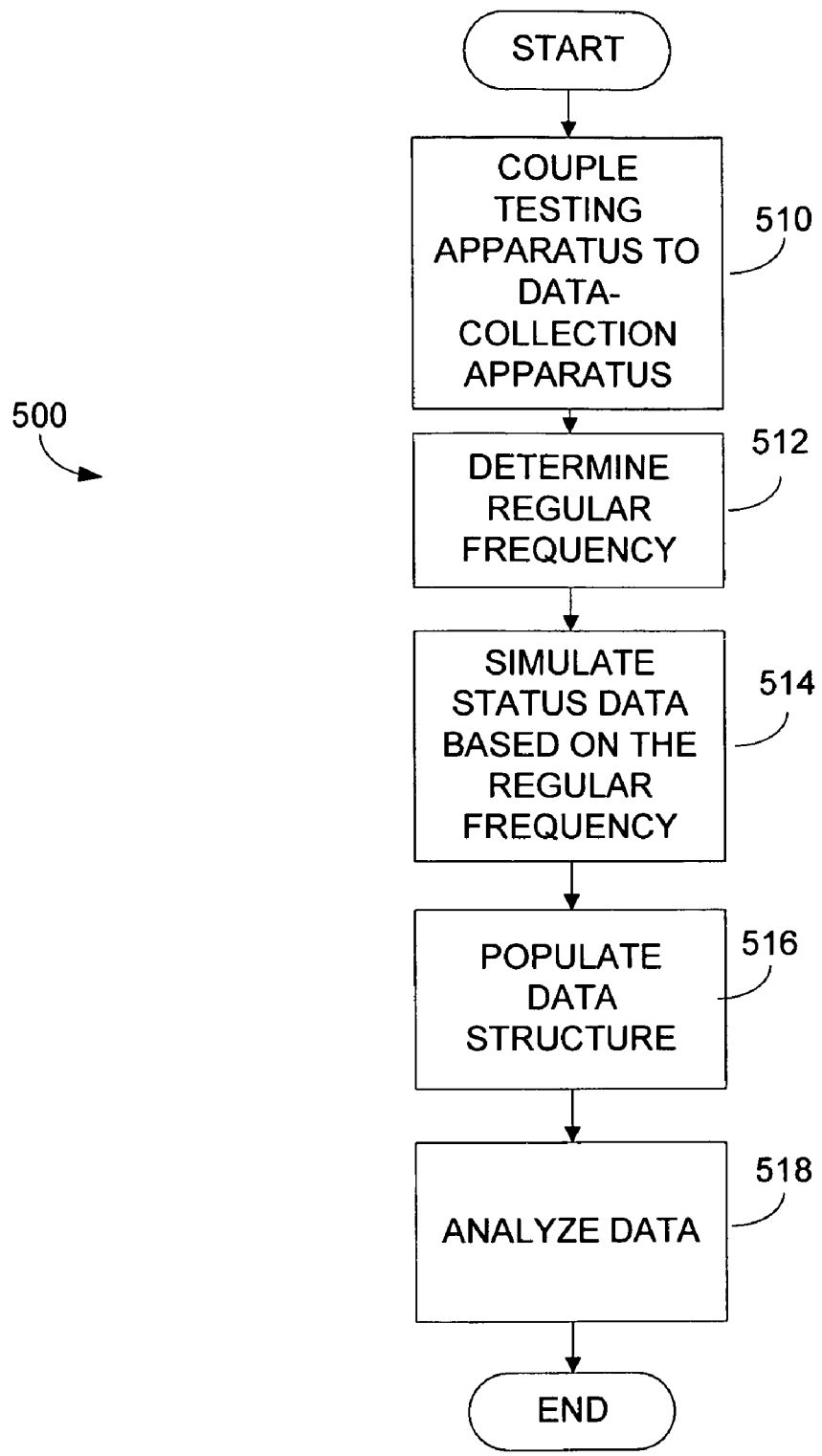
FIG. 5A is a flowchart of one embodiment of a method for synthetically reproducing a randomly occurring process.
Figure 5B:
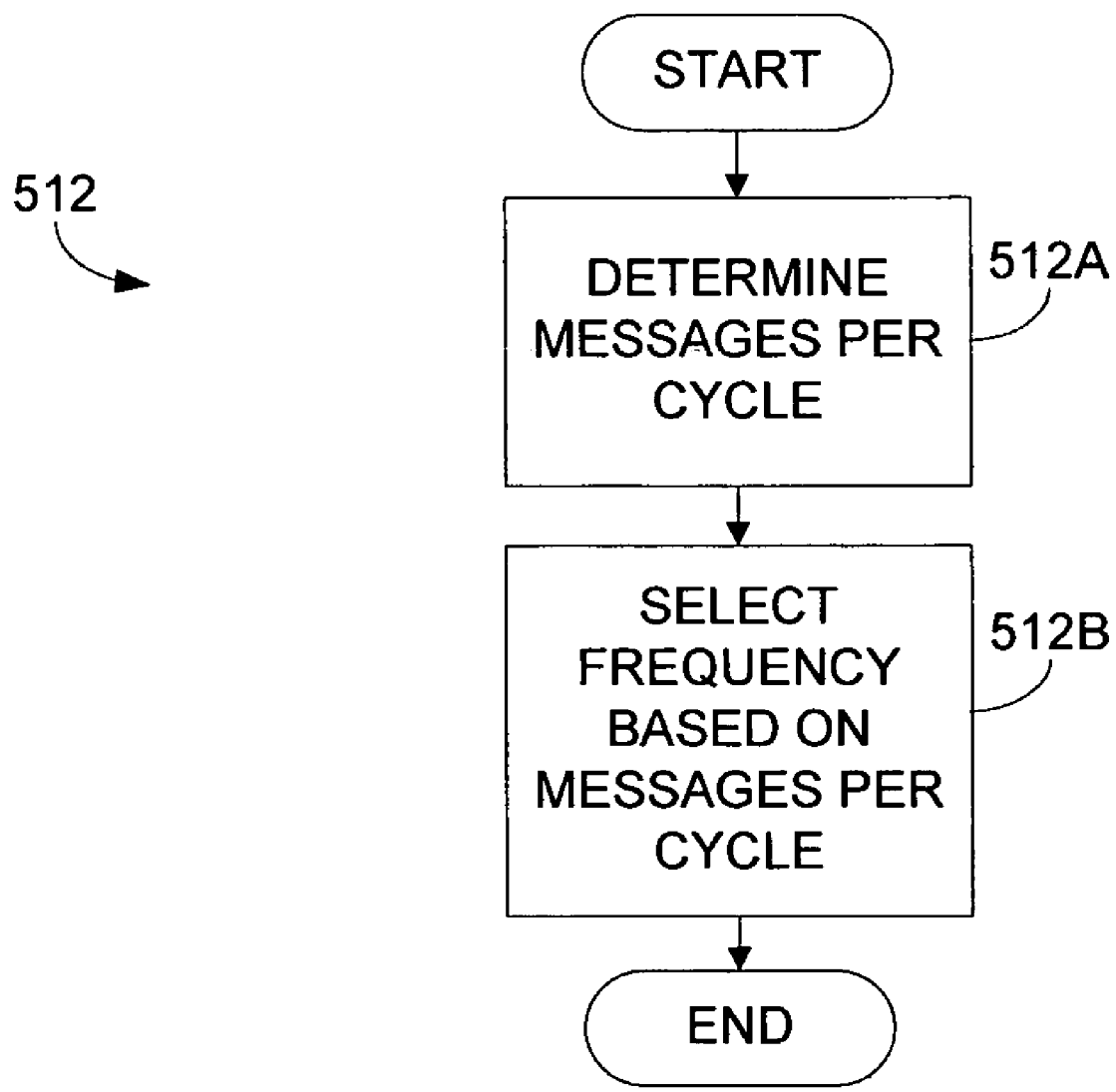
FIG. 5B is a flowchart of one embodiment of a method for determining a regular frequency for synthetically reproducing a randomly occurring process.

Turning now to FIG. 5A, there is shown a flow chart of one embodiment of a method 500 for synthetically reproducing a randomly occurring process. Method 500 may be implemented using circuitry 400 of FIG. 4. At a step 510, a testing apparatus is coupled to a data-collection apparatus or ACD. At a step 512, a regular frequency is determined. The regular frequency is the frequency at which synthetic status data is generated. The regular frequency should be chosen so as to have the appropriate resolution to monitor each transition from an alarm to an alarm-clear message. With reference to FIG. 5B, there is shown a flow chart of one embodiment of a method 512 for determining a regular frequency. At a step 512A, based on the type and storage capacity of the ACD that is desired to be tested, the number of supported alarm and alarm-clear messages per cycle are determined. This is determined based upon the clock of the ACD. An ACD having a clock cycle of one second may be able to accept one instance of status data (alarm or alarm-clear message) every second. At a step 512B, the regular frequency is determined based on the number of alarm and alarm-clear messages per cycle which are supported by the ACD that is desired to be tested. As previously discussed, the regular frequency should be chosen so as to maximize the data values in the alarm log or data store coupled to the ACD, thus increasing the probability of reproducing a random process. The regular frequency provides the ability to detect when an alarm and an alarm-clear message appears and whether the ACD responds accordingly.

Method 500 continues at a step 514, where a fault condition or housekeeping alarm is simulated and transmitted to the ACD at the regular frequency chosen at step 512. In one embodiment, at a step 516, the known alarm and alarm-clear messages synthetically produced by the testing apparatus are stored in a data structure of a data store. The response of the ACD may also be stored on the same data store in a separate data structure or in the same data structure. At a step 518, the data in the data structures from the testing apparatus and the ACD are compared and, based on the regular frequency, any anomalies in the ACD reporting an alarm-clear message may be determined.

Figure 5C:
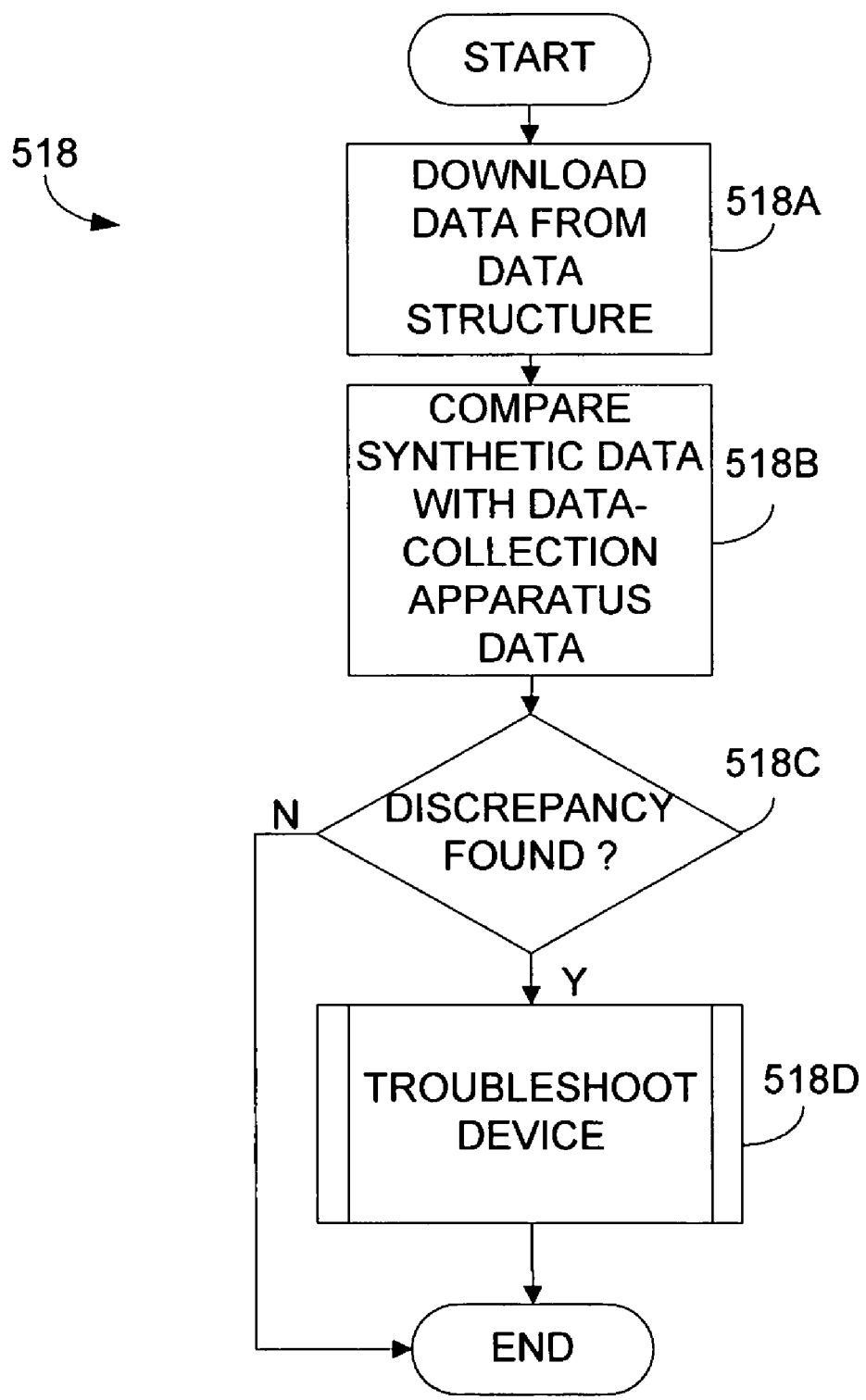
FIG. 5C is a flowchart of one embodiment of a method for comparing synthetic status data and data produced by a data-collection apparatus.

Turning now to FIG. 5C, one embodiment of a method for implementing step 518 is described in further detail. At a step 518A, synthetic status data and data from an ACD are downloaded from their respective data structures. At a step 518B, the synthetic data and ACD data in an alarm log (data structure) are compared. The comparison is possible because the synthetic status data is generated at a regular frequency. Thus, it is known for each instance of status data the time when the status data was transmitted to the ACD. If an alarm and corresponding alarm-clear message was transmitted to the ACD, and the ACD did not acknowledge the alarm-clear message in an alarm log (data structure), then a discrepancy exists between the synthetic status data and the data in the alarm log. The known discrepancy indicates a fault has occurred (randomly occurring process) and a troubleshooting procedure may be performed at a step 518D to determine the cause of the fault.

As can be seen, embodiments of the present invention and their equivalents are well adapted to provide a new and useful system and method for reproducing a randomly occurring process. Many different arrangements of the various components depicted, as well as components not shown, are possible without departing from the spirit and scope of the present invention.

Further, the embodiments of the present invention are intended in all respects to be illustrative rather than restrictive. Alternative embodiments will become apparent to those skilled in the art that do not depart from its scope. Many alternative embodiments exist but are not included because of the nature of this invention. A skilled programmer, scientist, or engineer may develop alternative means of implementing the aforementioned improvements without departing from the scope of the embodiments of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for reproducing a random process, comprising:
   a data-collection apparatus coupled to a status-monitoring site, wherein said data-collection apparatus is operable to collect status data on at least one alarm point, wherein said status data comprises an alarm portion and an alarm clear portion; and
   a test device coupled to said data-collection apparatus and operable to generate, at a regular frequency, synthetic status data relating to said at least one alarm point; and
   wherein data produced by said data-collection apparatus is responsive to each instance of said synthetic status data generated at said regular frequency and can be accessed by said status-monitoring site to determine if said random process is reproduced.

2. The system of claim 1, wherein said at least one alarm point includes at least one relay having a contact closure, said contact closure providing status data.

3. The system of claim 2, wherein said at least one relay corresponds to at least one of the following:
   a door alarm;
   a fire alarm;
   a water-level alarm;
   a generator alarm;
   a power-failure alarm;
   a toxic-gas alarm; and
   combinations thereof.

4. The system of claim 1, wherein said status-monitoring site is in a network communications environment.

5. The system of claim 1, wherein a duration of said alarm and alarm-clear portions may be half of a period of said regular frequency.

6. The system of claim 1, wherein said alarm and alarm-clear portions of said status data respectively comprise signals indicative of said at least one alarm point in an alarm state and a state in which said alarm state is cleared.

7. The system of claim 1, wherein said data-collection apparatus includes a rewritable data store that comprises a storage capacity and said regular frequency is chosen such that said capacity of said data store is filled with a maximum number of instances of said synthetic status data.

8. The system of claim 1, wherein said test device comprises:
   a frequency-generating component operable to generate at said regular frequency said alarm and alarm-clear portions of said status data; and a component operable to couple said frequency-generating component to said data-collection apparatus.

9. The method of claim 8, further comprising one or more rewritable data stores coupled to said test apparatus and said data-collection apparatus, said one or more rewritable data stores operable to store said each instance of said synthetic status data being generated and said data produced by said data-collection apparatus responsive to said each instance of said synthetic status data.

10. A method for synthetically reproducing a random process, comprising:
   coupling a test apparatus to a data-collection apparatus, wherein said data-collection apparatus collects status data corresponding to at least one alarm point, wherein said status data comprises an alarm portion and an alarm clear portion;
   coupling said data-collection apparatus to a status-monitoring site;
   said test apparatus generating at a regular frequency synthetic status data relating to said at least one alarm point, wherein said test apparatus transmits said synthetic status data to said data-collection apparatus; and
   based on said synthetic status data and data produced by said data-collection apparatus responsive to each instance of said synthetic status data, wherein data produced by data-collection apparatus can be monitored at said status-monitoring site, determining an occurrence of said random process.

11. The method of claim 10, wherein said at least one alarm point includes at least one relay having a contact closure, said contact closure providing status data.

12. The method of claim 11, wherein said at least one relay corresponds to at least one of the following:
   a door alarm;
   a fire alarm;
   a water-level alarm;
   a generator alarm;
   a power-failure alarm;
   a toxic-gas alarm; and
   combinations thereof.

13. The method of claim 10, further comprising monitoring said test apparatus and said data-collection apparatus in a network communications environment by said status-monitoring site.

14. The method of claim 10, further comprising coupling one or more rewritable data stores to said test apparatus and said data-collection apparatus, said one or more rewritable data stores operable to store each instance of said synthetic status data being generated and data produced by said data-collection apparatus responsive to said each instance of said synthetic status data.

15. The method of claim 14, wherein generating at a regular frequency synthetic status data comprises generating one or more synthetic alarm and alarm-clear signals, wherein said synthetic alarm and alarm-clear signals have a duration of one half of a period of said regular frequency.

16. The system of claim 15, wherein said alarm and alarm-clear portions of said status data respectively comprise signals indicative of said at least one alarm point in an alarm state and a state in which said alarm state is cleared.

17. A method for determining the error-rate of a device for monitoring one or more alarm points in a network communications environment, comprising:
   generating one or more synthetic alarm and corresponding alarm-clear messages at a regular frequency, corresponding to said one or more alarm points, at one or more alarm collection devices coupled to a status-monitoring site; and
   for each of said generated one or more synthetic alarm and corresponding alarm-clear messages, detecting at said status-monitoring site if a respective clear message is generated by said one or more alarm collection devices.

18. The method of claim 17, wherein said generated synthetic alarm and corresponding alarm-clear messages comprise said synthetic messages relating to at least one of the following:
   a door alarm;
   a fire alarm;
   a water-level alarm;
   a generator alarm;
   a power-failure alarm;
   a toxic-gas alarm; and
   combinations thereof.

19. The method of claim 18, wherein said alarm and corresponding alarm-clear messages have a duration of one half of a period of said regular frequency.

20. The system of claim 19, wherein said synthetic alarm and corresponding alarm-clear messages respectively comprise signals indicative of said one or more alarm points in an alarm state and a state in which said alarm state is cleared.

21. The method of claim 20, wherein said one or more alarm collection devices are coupled to said one or more alarm points in a network communications environment.

* * * * *